United States Patent [19]

Kruse

[11] 3,875,132

[45] Apr. 1, 1975

[54] TETRAALKYLCHROMIUM COMPOUNDS AND USE AS OLEFIN POLYMERIZATION CATALYSTS

[75] Inventor: Walter M. Kruse, Wilmington, Del.

[73] Assignee: Hercules Incorporated, Wilmington, Del.

[22] Filed: May 21, 1973

[21] Appl. No.: 362,028

Related U.S. Application Data

[60] Division of Ser. No. 269,693, July 7, 1972, Pat. No. 3,798,250, which is a continuation-in-part of Ser. No. 112,018, Feb. 2, 1971, abandoned.

[30] Foreign Application Priority Data

Dec. 30, 1971 Canada................................. 131388

[52] U.S. Cl............. 260/93.7, 252/430, 252/431 R, 260/94.9 B, 260/94.9 DA
[51] Int. Cl. ............................................. C08f 1/30
[58] Field of Search... 252/431 R; 260/93.7, 94.9 B, 260/94.9 DA

[56] References Cited

UNITED STATES PATENTS

| 3,709,853 | 1/1973 | Karapinka.................. 260/94.9 DA |
| 3,757,002 | 9/1973 | Karol ......................... 260/94.9 DA |

*Primary Examiner*—Edward J. Smith
*Attorney, Agent, or Firm*—Edith A. Rice; Edwin H. Dafter, Jr.

[57] ABSTRACT

A new class of organochromium compounds are described, namely, tetravalent chromium compounds having the formula $Y_4Cr$ where Y is alkyl, cyclohexyl-substituted alkyl or phenyl-substituted alkyl. Typical compounds are tetra(neopentyl)chromium, tetra(cyclohexylmethyl)chromium and tetra(neophyl)-chromium. These compounds are new catalysts for the polymerization of 1-olefins and can be used in solution or extended on a solid support such as silica.

13 Claims, No Drawings

TETRAALKYLCHROMIUM COMPOUNDS AND USE AS OLEFIN POLYMERIZATION CATALYSTS

This application is a division of my copending U.S. application Ser. No. 269,693, filed July 7, 1972, now U.S. Pat. No. 3,798,250 which is in turn a continuation-in-part of applications Ser. No. 112,018, filed February 2, 1971, and now abandoned.

This invention relates to new organochromium compounds and more particularly to tetraalkylchromium compounds and to their use as catalysts for the polymerization of 1-olefins.

Many complex organochromium compounds are known such as the metal carbonyls or the so-called sandwich compounds in which the organo groups are bound to the metal as planar systems as, for example, the π-allkyl compounds, the bis(arene) compounds and compounds such as chromocene. Alkylchromium compounds are likewise known wherein the alkyl group is a simple alkyl such as ethyl, propyl, butyl, etc., but in all such previously known alkyl compounds the chromium was divalent or trivalent and all of these compounds are very unstable, decomposing at temperatures of −20°C. or lower when stabilizing ligands are removed.

Now in accordance with this invention, tetraalkylchromium compounds have been prepared, which compounds are surprisingly stable, many of them being stable at room temperature. In addition, they are excellent catalysts for the polymerization of 1-olefins, being useful as catalysts under a wide variety of polymerization conditions. The tetraalkylchromium compounds of this invention have the general formula

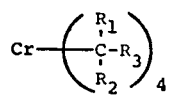

where $R_1$ and $R_2$ are each selected from H and methyl, and $R_3$ is selected from H, alkyl, cyclohexyl, alkylcyclohexyl, cyclohexylalkyl and dimethylbenzyl. Exemplary of these tetraalkylchromium compounds are those having the formula $CrY_4$ where Y is an alkyl radical containing 1 to 8 carbon atoms such as methyl, ethyl, propyl, isopropyl, butyl, isobutyl, sec.-butyl, tert-butyl, pentyl, isopentyl, neopentyl, hexyl, isohexyl, neohexyl, 2-ethylbutyl, octyl, 2-ethylhexyl, 2,2-diethylbutyl, 2-isopropyl-3-methylbutyl, etc., cyclohexylalkyls such as $-(CH_2)_n-C_6H_{11}$ where n is 1 to 4 as, for example, cyclohexylmethyl, 2-cyclohexylethyl, 3-cyclohexylpropyl, 4-cyclohexylbutyl, and the corresponding alkyl-substituted cyclohexyl radicals as, for example, (4-methylcyclohexy)methyl, and neophyl, i.e., beta, beta-dimethyl-phenethyl.

the tetraalkylchromiums of this invention can prepared by reacting an alkyllithium with a suitable chromium compound in an inert aliphatic hydrocarbon or an anhydrous ethyl ether. A preferred procedure is to react the alkyllithium compound with a tetravalent chromium compound such as chromium tetra-tertbutylate, i.e., $Cr(O-tert.-C_4H_9)_4$. In fact, the chromium compound must be tetravalent if the alkyl group of the alkyllithium is not highly branched. However, if the alkyl group is highly branched, it is not essential that a tetravalent chromium compound be employed. By "highly branched" is meant that the alkyl group is branched at either or both of the carbon atoms alpha and beta to the lithium atom. In such case, any anhydrous divalent or trivalent chromium salt may be used as, for example, chromous and chromic halides, the tetrahydrofuranates of chromous and chromic chlorides, chromium acetylacetonate and the like. For example, when neopentyllithium is reacted with chromous or chromic chloride the product is tetraneopentyl-chromium, tetravalent chromium being generated by a disproportionation reaction with the formation as by-products of lower valence chromium compounds or chromium metal.

As already indicated, the reaction between the alkyl-lithium and the chromium salt can be carried out in an inert aliphatic hydrocarbon diluent or in anhydrous ethyl ether. Typical hydrocarbon solvents are pentane, hexane, heptane, and octane. In general, the reaction is carried out at a low temperature such as −78°C. but any temperature from about −100°C. to about 30°C. can be used. Some of the tetraalkylchromium compounds are so thermally stable that they can be isolated by evaporation of the diluent and then purified by sublimation if desired. Others being less thermally stable are best handled in solution and stored at low temperature. These new tetraalkylchromiums are stable in anhydrous polar solvents but hydrolyze over a period of a few minutes in a water-miscible solvent such as acetone which contains water. They all react rapidly with oxygen, halogens, and acids.

The following examples will illustrate the preparation of the new tetraalkylchromium compounds of this invention. All parts and percentages are by weight unless otherwise stated.

EXAMPLE 1

Neopentylithium was prepared by reacting neopentyl chloride with lithium wire in pentane in a 1:2 molar ratio, stirring the mixture for 6 hours at 70°–80°C.

To a suspension of 1.875 g. of chromic chloride tetrahydrofuranate ($CrCl_3 \cdot 3THF$) in 32 g. of pentane at −78°C. and under vacuum was added slowly 40 ml. of a 0.5 M solution of neopentyllithium in pentane. The purple solution was allowed to warm to room temperature during 1 hour. Gaseous carbon dioxide was then passed in to precipitate the excess alkyllithium. After centrifugation, the supernatant liquid was separated and evaporated to dryness under vacuum. The dark red solid that remained was transferred under argon to sublimer. It sublimed under high vacuum at 70°C. The yield of tetrakis(neopentyl)chromium so obtained amounted to 25% based on the $CrCl_3 \cdot 3THF$ used. It had a melting point of about 110°C. and starts decomposing at about 150°C. In heptane solution, it decomposes at temperatures above 150°C. in about 3 hours. On analysis, it was found to contain 15.28% chromium (theory is 15.48 percent). It showed a major mass spectral peak at 336 (theory 336). Electron spin resonance and magnetic susceptibility measurements showed that the chromium had a valence of four.

EXAMPLE 2

Example 1 was repeated except that tert.-butyllithium was used in place of the neopentyllithium used in that example. The tetrakis(tert.-butyl)chromium so obtained was wine red and sublimed at 55°C. under high vacuum. The yield was 10 percent. Analysis for chromium showed it to contain 18.53 percent (theory is 18.54%). Electron spin resonance and magnetic susceptibility showed that the chromium was tetravalent.

EXAMPLE 3

Example 1 was repeated except that chromous chloride tetrahydrofuranate ($CrCl_2 \cdot 3THF$) was used in place of the chromic chloride used in that example. The electron spin resonance spectrum was identical to that of the tetrakis(neopentyl)chromium produced in Example 1.

EXAMPLE 4

To a solution of 450 mg. of $Cr(O\text{-tert.-butyl})_4$ in 5 ml. of pentane under vacuum at $-78°C$. was added slowly 8 ml. of a 0.5 M solution of neopentyllithium in pentane. A violent precipitate appeared which dissolved when the reaction mixture was allowed to warm to room temperature. Gaseous carbon dioxide was then passed in to the purple solution to precipitate the excess alkyllithium. The tetrakis(neopentyl)chromium was then isolated as described in Example 1. The yield was 75 percent based on the chromium tetra(tert.-butylate) used. Electron spin resonance and magnetic susceptibility measurements showed that the chromium was tetravalent.

EXAMPLE 5

Example 4 was repeated except that tert.-butyllithium was substituted for the neopentyllithium used in that example. The tetrakis(tert.-butyl)chromium sublimed at 55°C. under high vacuum. The yield was 75 percent based on the chromium tetra(tert.-butylate) used. On analysis it was found to contain 18.53 percent chromium (theory is 18.54 percent). Electron spin resonance and magnetic susceptibility measurements showed that the chromium had a valence of four. The compound in heptane solution was a half-life of about 10 minutes at 75°C.

EXAMPLES 6–17

In each of these examples, a solution of the alkyllithium compound was added to a suspension of the chromium salt or alkoxide in the diluent at $-78°C$. and under vacuum. The reaction mixtures were then allowed to warm to room temperature. In each case reaction either occurred immediately or during the warming to room temperature. In Examples 7, 8 and 10 to 16, the excess alkyllithium was precipitated by addition of carbon dioxide. The supernatant solution of alkylchromium compound produced in each case had the characteristic red color (absorption peak in the visible region at about $\lambda = 490\ m\mu$) that is exhibited by tetraalkylchromium compounds. That the chromium was tetravalent was further established by electron spin measurements on some of these solutions.

Tabulated in Table I is the alkyllithium and chromium compound reacted and the amount thereof, the diluent used, and the midfield and lowfield signal in gauss of the electron spin resonance spectrum.

Table I

| | Reactants | | | | | | Product | | |
|---|---|---|---|---|---|---|---|---|---|
| | Chromium | | Lithium | | | | ESR Signal | | |
| Example | Compound | g. | Alkyl | g. | Diluent | ml. | Midfield | Lowfield | Structure |
| 6 | $Cr(O\text{-}t\cdot C_4H_9)_4$ | 0.344 | methyl | 0.088 | pentane | 10 | – | – | $Cr(CH_3)_4$ |
| 7 | " | 0.344 | propyl | 0.200 | " | 10 | – | – | $Cr(C_3H_7)_4$ |
| 8 | " | 0.172 | isopropyl | 0.100 | " | 5 | – | – | $Cr[-CH(CH_3)_2]_4$ |
| 9 | " | 0.172 | n-butyl | 0.128 | " | 5 | 3266 | 1520 | $Cr(n\text{-}C_4H_9)_4$ |
| 10 | " | 0.172 | sec.-butyl | 0.128 | " | 5 | – | – | $Cr\begin{bmatrix}CH_3\\-CH\text{-}C_2H_5\end{bmatrix}_4$ |
| 11 | $CrCl_3 \cdot 3THF$ | 1.875 | isobutyl | 1.28 | " | 50 | – | – | $Cr[-CH_2\text{-}CH(CH_3)_2]_4$ |
| 12 | $Cr(O\text{-}t\cdot C_4H_9)_4$ | 0.172 | neohexyl | 0.184 | " | 10 | 3279 | 1621 | $Cr[-(CH_2)_3\text{-}CH(CH_3)_2]_4$ |
| 13 | $CrCl_3 \cdot 3THF$ | 1.875 | 2-ethylbutyl | 1.84 | " | 50 | – | – | $Cr[-CH_2\text{-}CH(C_2H_5)_2]_4$ |
| 14 | " | 0.375 | 2,2-diethyl-butyl | 0.480 | " | 10 | 3270 | 1535 | $Cr[-CH_2\text{-}C(C_2H_5)_3]_4$ |
| 15 | " | 0.375 | 2-isopropyl-3-methylbutyl | 0.480 | " | 10 | – | – | $Cr\begin{bmatrix}-CH_2\text{-}CH\text{-}CH(CH_3)_2\\CH(CH_3)_2\end{bmatrix}_4$ |
| 16 | " | 1.875 | neophyl | 11.28 | diethyl ether | 100 | 3250 | 1590 | $Cr[-CH_2\text{-}C(CH_3)_2\text{-}C_6H_5]_4$ |
| 17 | $Cr(O\text{-}t\cdot C_4H_9)_4$ | 0.344 | cyclohexyl-methyl | 0.416 | pentane | 10 | 3285 | 1571 | $Cr(-CH_2\text{-}C_6H_{11})_4$ |

The tetraalkylchromium compounds of this invention comprise an unusual group of catalysts for the polymerization of 1-olefins. They are a very versatile group of catalysts, being effective under a wide range of conditions. Any 1-olefin can be polymerized by means of these new catalysts as, for example, ethylene, propylene, butene-1, hexene-1, octene-1, etc. and mixtures of these olefins.

These new polymerization catalysts can be used in batch or continuous processes. Generally the polymerization process is carried out in the presence of a liquid diluent such as a liquid hydrocarbon, which can be any aliphatic, cycloaliphatic or aromatic hydrocarbon that is free of ethylenic unsaturation. Exemplary of such diluents are pentane, hexane, heptane, isooctane, decane, cyclohexane, benzene, toluene, xylene, etc. A mixture of the olefin being polymerized and the liquid hydrocarbon can be allowed to flow over a fixed catalyst bed or the olefin can be passed into a mixture of the catalyst and the liquid hydrocarbon. In the latter case, the process can be operated as a slurry process by operating at a temperature below that at which the polymer dissolves or as a solution process by operating at a temperature above that at which the polymer dissolves. These catalysts can also be extended on a solid support and used, with an inert diluent or without a diluent, in a fluidized bed process.

The tetraalkylchromium compounds of this invention can be extended on any oxidic carrier material as, for example, any silica, alumina, thoria, titania, etc., particulate material as well as the mixed alumino-silicates, etc. The carrier can be impregnated and/or reacted with the tetraalkylchromium compound in a variety of ways. A hydrocarbon solution of the tetraalkylchromium can be mixed with the oxidic material and allowed to stand until the reaction is complete or the solvent can be removed under vacuum, whereupon the layer of tetraalkylchromium on the surface reacts almost immediately and the chromium is insolubilized on the surface. The hydrocarbon solution-carrier mixture can also be exposed to light, whereupon the tetraalkylchromium is transformed into a species which is much more reactive toward the carrier surface. This photodeposition must be carefully controlled to avoid further reaction which inactivates the adsorbed chromium species. Another method is react the tetraalkylchromium with the carrier thermally and then expose this adsorbed species to light to activate it. The amount of the chromium compound extended on the solid support can be varied as desired but generally will be from about 0.005 to about 0.5 millimole per gram of the carrier.

In some cases, the tetraalkylchromium compound can be used as the catalyst without any activator. However, yields and rates of polymerization are generally enhanced by using a combination of the tetraalkylchromium compound and activator. Again, because of the versatility of these catalysts, a wide variety of activators can be used. Visible and/or ultraviolet light can be used as the activator or a metalalkyl can be used as the activator or a combination of the two can be used. Exemplary of the activators that can be used are mercury and zinc dihydrocarbon compounds, boron trihydrocarbons, organoaluminum compounds, and lead, tin or germanium tetrahydrocarbon compounds. Thus, any compound having the formula $MR_n$, where M is Hg, Zn, B, Al, Pb, Sn or Ge, R is a hydrocarbon radical free of ethylenic unsaturation and n is the valence of M, can be used. Examples of these compounds are those where the R's are alike or different and can be alkyl, cycloalkyl, alkylcycloalkyl, aryl, aralkyl and alkaryl such as methyl, ethyl, propyl, n-butyl, tert.-butyl, cyclohexyl, phenyl, benzyl, tolyl, etc. In addition, aluminum compounds having the formula

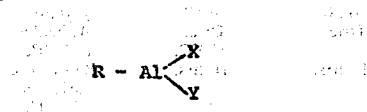

where R is an alkyl, alkenyl, cycloalkyl, aryl, aralkyl, alkaryl etc. group and X and Y are R (which can be the same or different), halide, H, alkoxide, etc. can be used. Of particular importance are the alkylaluminum dihalides or trialkylaluminum compounds. Exemplary of the organoaluminum compounds that can be used are trimethylaluminum, triethylaluminum, tri(n-butyl)aluminum, triisobutylaluminum, ethylaluminum dichloride, methylaluminum sesquichloride, ethylaluminum sesquichloride, diisobutylaluminum hydride, trihexylaluminum, trioctylaluminum, tridodecylaluminum, aluminum isoprenyl, triphenylaluminum, tribenzylaluminum, tri(cyclohexyl)aluminum, etc. Another type of organoaluminum compound that can be used to activate the polymerization is the reaction product of a trialkylaluminum with from about 0.05 to about 1.5 moles of water, which reaction may be carried out in situ or the reaction can be carried out prior to the polymerization process. When an organometallic activator is used it generally will be used in an amount such that the molar ratio of it to the chromium compound will be within the ratio of from about 0.5:1 to 100:1 and preferably from about 1:1 to about 10:1.

The temperature at which the polymerization is carried out will depend upon the type of process used, but generally will be within the range of from about 0°C. to about 120°C., although higher or lower temperatures can be used. Any pressure from subatmospheric to as high as 30 atmospheres or more, can be used. Any amount of the chromium compound can be used to catalyze the polymerization from a minor catalytic amount to a large excess, if desired.

The following examples will illustrate the process of polymerizing 1-olefins with the tetraalkylchromium catalysts of this invention.

EXAMPLE 18

A polymerization vessel of 340 ml. capacity equipped with a magnetic stirring bar and filled with argon was charged with 50 ml. of n-heptane which had been freed of impurities. The vessel was painted black in order to exclude light. The following reagents were added in order: $2.0 \times 10^{-5}$ moles of triethylaluminum, $1.0 \times 10^{-5}$ moles of tetra(tert.-butyl) chromium and ethylene to a pressure of 30 p.s.i.g. The mixture was stirred for 17 hours at 25°C. and then vented. The polyethylene so produced was separated and air-dried. It amounted to 0.71 g. which was equivalent to 71 g. per millimole of chromium.

EXAMPLE 19

The procedure described in Example 18 was repeated except that an unpainted glass vessel was used and after all ingredients had been charged, the vessel was exposed to a 275 watt sunlamp placed 12 inches from the bottle. The reaction was continued until the solution was colorless; 162 minutes. The polyethylene so produced amounted to 1.250 g. or 125 g. per millimole of chromium produced at a rate of 23 g./mmole Cr/atm./hr.

EXAMPLE 20

A sample of microspheroidal silica gel was annealed at 700°C. A 2.5 g. portion of this silica was placed in a polymerization vessel (with a magnetic stirring bar), and the vessel was sealed and flushed with argon. The vessel was charged with 50 ml. of n-heptane and was placed in a bath at 50°C.; ethylene was introduced to 30 p.s.i.g. and $5.0 \times 10^{-5}$ moles of tetra(tert.-butyl) chromium were added. The vessel contents were stirred for 17 hours with a constant feed of ethylene. At the end of this time the vessel was vented, opened to the atmosphere, and sealed. The white solid polyethylene was separated and weighed 19.2 g. This is a productivity of 380 g. per millimole of chromium at a rate of 11 g./mmole Cr/atm./hr.

EXAMPLE 21

A pyrogenic alumina was annealed at 750°C. for 3 days, cooled to room temperature, and then was exposed to water vapor for five days. To a 6.0 g. portion of this alumina, dried under a stream of argon 1 hour at 200°C., was added 90 ml. of pentane and $7.15 \times 10^{-4}$ moles of tetra(tert.-butyl)chromium as a solution in 10 ml. of pentane. After 30 minutes, the pentane was removed with a stream of argon at 50°C. to deposit the chromium compound on the alumina (0.32% Cr by analysis). A 1.57 g. portion of this catalyst was placed under argon in a polymerization vessel along with 300 ml. heptane. The vessel and contents were equilibrated at 50°C. and ethylene was added to 37 p.s.i.g. Polymerization began on introduction of triethylaluminum, a total of $1.0 \times 10^{-3}$ moles of the latter being added in two increments. In 24.9 hours the polymerization produced 44.0 g. of polyethylene from $9.7 \times 10^{-5}$ moles of chromium, a productivity of 455 g. per millimole Cr and a rate of 9.1 g./mmole Cr/atm./hr.

EXAMPLE 22

A glass polymerization vessel equipped with a magnetic stirring bar and filled with argon was charged with 50 ml. of n-heptane, $1 \times 10^{-5}$ moles of tetraneopentylchromium and $2 \times 10^{-5}$ moles of ethylaluminum dichloride. The vessel and contents were equilibrated at 4°C. and exposed to a 275 watt sunlamp positioned 12 inches from the vessel. After 0.6 hour the lamp was removed and ethylene was introduced to a pressure of 30 p.s.i.g. and the temperature was raised to 50°C. After 2.3 hours at that temperature, the vessel was vented, cooled, and the polyethylene was isolated. It amounted to a productivity of 73 g. per millimole of chromium and a rate of 16.0 g./mmole Cr/atm./hr.

EXAMPLE 23

The general procedure of Example 22 was followed but using $2 \times 10^{-5}$ moles of triethylaluminum as activator instead of the ethylaluminum dichloride used in that example. In this case the irradiation was carried out at −10°C. for 0.7 hour under an ethylene pressure of 30 p.s.i.g. The lamp was removed and with the temperature raised to 50°C. The polymerization was continued for 2.8 hours. The polyethylene so obtained amounted to a productivity of 186 g. per millimole of chromium and a rate of 33 g./mmole Cr/atm./hr.

EXAMPLE 24

The procedure of Example 22 was repeated except that the activator was trimethylaluminum in place of the ethylaluminum dichloride used in that example. The irradiation was carried out at 2° to 6°C. for 1.2 hours, after which the lamp was removed, ethylene introduced at a pressure of 30 p.s.i.g. and the polymerization was carried out at 50°C. for 1.9 hours. The polyethylene so obtained amounted to a productivity of 35 g. per millimole of chromium and a rate of 9.2 q./mmole Cr/atm./hr.

EXAMPLE 25

Example 24 was repeated except that diisobutylaluminum hydride was used as the activator, the irradiation was carried out for 0.6 hour and the polymerization for 2.8 hours. The polyethylene so obtained amounted to a productivity of 21 g. per millimole of chromium and a rate of 4.1 g./mmole Cr/atm./hr.

EXAMPLES 26-32

These examples demonstrate the preparation of a catalyst prepared by extending tetraneopentylchromium on silica by various means and use of these catalysts for the polymerization of ethylene under varying conditions. In Examples 26, 27, 29 and 30 the chromium compound was mixed with the silica in 300 ml. of n-heptane (15 ml. in Example 27) and reacted thermally in the dark. In Example 32 the reaction was carried out by photolysis, the mixture of silica and chromium compound in 300 ml. of n-heptane being stirred while exposed to a 275 watt sunlamp positioned 12 inches from the reactor and in Example 26 been photolysis and thermal reaction was used. In Example 31, the chromium compound and silica were mixed in pentane and the diluent was evaporated at 50°C. whereupon an immediate reaction took place.

The polymerizations were all conducted in 300 ml. of n-heptane and under an ethylene pressure of 30 p.s.i.g.

Tabulated in Table II is the data for the preparation of the catalysts and the polymerization of ethylene with each catalyst, along with the yield of polyethylene expressed in grams per millimole of chromium and the rate (g./mmole Cr/atm./hr.).

TABLE II

| Example | 26 | 27 | 28 | 29 | 30 | 31 | 32 |
|---|---|---|---|---|---|---|---|
| Catalyst Preparation | | | | | | | |
| SiO$_2$, g. | 0.25 Dried 150-160°C. 16 hours | 0.50 Annealed at 700°C. Before use dried 200°C. for 5 hrs. | 0.50 Annealed at 700°C. Before use dried 200°C. for 5 hrs. | 0.50 Dried 330°C. 16 hrs. | 0.50 Dried 330°C. 16 hrs. | 0.50 Annealed at 700°C. Before use dried at 150°C. | 0.50 Dried 200°C. 4 hrs. |
| (Neopentyl)$_4$Cr Moles | $3 \times 10^{-5}$ | $7 \times 10^{-5}$ | $3 \times 10^{-5}$ | $5 \times 10^{-5}$ | $5 \times 10^{-5}$ | $7.3 \times 10^{-5}$ | $3.0 \times 10^{-5}$ |
| Temp., °C. | 80 | 25 | Exposed to light 2 hrs. at 20°C. | 25 | 25 | 50 | 25 Exposed to light |
| Time, hr. | 3 | 16 | Heated at 80°C. for 1 hour. | 19 | 66 | — | 3 |

TABLE II—Continued

| Example | 26 | 27 | 28 | 29 | 30 | 31 | 32 |
|---|---|---|---|---|---|---|---|
| Ethylene Polymerization | | | | | | | |
| Activator | None | None | None | $(C_2H_5)_3Al$ | $(C_2H_5)_3Al$ and $(C_2H_5)_3B$ | None | $(C_2H_5)_3B$ |
| mmoles | — | — | — | $1\times10^{-4}$ | $1\times10^{-4}$ each | — | $1\times10^{-4}$ |
| Temp., °C. | 80 | 80 | 80 | 50 | 50 | 75 | 80 |
| Time, hrs. | 4.0 | 4.5 | 2.1 | 4.0 | 4.4 | 17 | 0.8 |
| Yield, g/mmole Cr | 615 | 364 | 190 | 500 | 1400 | 2120 | 213 |
| Rate | 110 | 58 | 60 | 74 | 187 | 83 | 165 |

EXAMPLE 33

A polymerization vessel filled with argon was charged with 50 ml. of heptane and ethylene to a pressure of 30 p.s.i.g. at 60°C. There was injected $8\times10^{-6}$ moles of tetra(neophyl)chromium and after one hour $2\times10^{-5}$ moles of triethylaluminum was injected. Polymerization ensued after injection of the activator.

EXAMPLE 34

A polymerization vessel equipped with a magnetic stirrer was charged with 0.5 g. of a commercial pyrogenic silica, that had been dried for 4 hours at 200°–210°C., and $5\times10^{-5}$ moles of tetraneopentylchromium in 300 ml. of n-heptane. The mixture was stirred for 17 hours at 50°C. There was then added $1\times10^{-4}$ moles of triethylboron and $1\times10^{-4}$ moles of triethylaluminum and propylene was then introduced to a pressure of 40 p.s.i.g. The temperature, 50°C., and pressure were maintained for 21.5 hours. The polypropylene so produced amounted to 66 grams per millimole of chromium and the rate was 1.1 g./mmole Cr/atm./hr.

What I claim and desire to protect by Letters Patent is:

1. A polymerization catalyst comprising a tetraalkylchromium compound having the formula

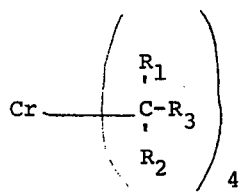

wherein $R_1$ and $R_2$ are each selected from H and methyl and $R_3$ is selected from H, alkyl, cyclohexyl, alkylcyclohexyl, cyclohexylalkyl and dimethylbenzyl; extended on an oxidic carrier material.

2. The catalyst of claim 1 wherein the oxidic carrier material is silica.

3. The catalyst of claim 2 wherein the tetraalkylchromium compound is tetra(tert.-butyl)chromium.

4. The catalyst of claim 2 wherein the tetraalkylchromium compound is tetra(neopentyl)chromium.

5. The process of polymerizing 1-olefins which comprises contacting at least one 1-olefin with a catalyst comprising a tetraalkylchromium compound having the formula

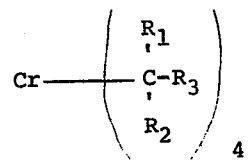

where $R_1$ and $R_2$ are each selected from H and methyl and $R_3$ is selected from H, alkyl, cyclohexyl, alkylcyclohexyl, cyclohexylalkyl and dimethyl benzyl.

6. The process of claim 5 wherein the catalyst is activated by the addition of an organometallic activator selected from the group consisting of compounds having the formula $MR_n$ where M is Hg, Zn, B, Al, Pb, Sn or Ge, R is a hydrocarbon radical free of ethylenic unsaturation and n is the valence of M and compounds having the formula

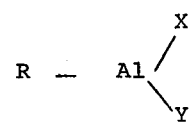

where R is alkyl, alkenyl, cycloalkyl, aryl, aralkyl or alkaryl and X and Y are R, halide, hydrogen or alkoxide.

7. The process of claim 6 wherein the activator is an organoaluminum compound.

8. The process of claim 5 wherein the tetraalkylchromium is extended on a oxidic carrier material.

9. The process of claim 8 wherein the oxidic carrier material is silica.

10. The process of claim 9 wherein the catalyst is activated by the addition of alkylaluminum compound.

11. The process of claim 9 wherein the catalyst is activated by the addition of a trihydrocarbonboron.

12. The process of claim 10 wherein ethylene is polymerized.

13. The process of claim 10 wherein propylene is polymerized.

* * * * *